(12) United States Patent
Pepper et al.

(10) Patent No.: US 7,821,704 B1
(45) Date of Patent: Oct. 26, 2010

(54) COMPACT, TUNABLE, EFFICIENT IR LASER AND IR GUIDING SILICA FIBERS

(75) Inventors: David M. Pepper, Malibu, CA (US); Hans Bruesselbach, Monte Nido, CA (US); Bryan Fong, Los Angeles, CA (US)

(73) Assignee: HRL Laboratories, LLC, Malibu, CA (US)

(*) Notice: Subject to any disclaimer, the term of this patent is extended or adjusted under 35 U.S.C. 154(b) by 306 days.

(21) Appl. No.: 11/805,276

(22) Filed: May 21, 2007

Related U.S. Application Data

(60) Provisional application No. 60/885,875, filed on Jan. 19, 2007.

(51) Int. Cl.
*H04B 10/17* (2006.01)
*G02B 6/032* (2006.01)
*G02B 6/036* (2006.01)

(52) U.S. Cl. .................. 359/344; 385/125; 385/126
(58) Field of Classification Search ............... 359/334; 385/125, 126
See application file for complete search history.

(56) References Cited

U.S. PATENT DOCUMENTS 6,496,634 B1 * 12/2002 Levenson .................. 385/125

2004/0125827 A1 * 7/2004 Martinelli et al. ............... 372/3
2005/0078714 A1 * 4/2005 Komine .......................... 372/3
2005/0213615 A1 * 9/2005 Hirth et al. ...................... 372/4

OTHER PUBLICATIONS

Benabid et al., "Ultrhigh Efficiency Laser Wavelength Conversion in a Gas-Filled Hollow Core Photonic Crystal Fiber by Pure Stimulated Rotational Raman Scattering in Molecular Hydrogen", Physical Review Letters, vol. 93, No. 12, pp. 12903-1-4, Sep. 16, 2004.*

The Principles of Nonlinear Optics, Y. R. Shen, Wiley, New York (1984), pp. 156-158.*

(Continued)

*Primary Examiner*—Eric Bolda
(74) *Attorney, Agent, or Firm*—Ladas & Parry

(57) ABSTRACT

An IR laser source providing light in the IR spectrum, the laser source comprising a pump laser operating at a frequency equivalent to wavelength shorter than 2 μm and at a predetermined power, and an optic fiber coupled to the pump laser. The optic fiber has at least a section of a hollow core photonic crystal fiber, the at least a section of hollow core photonic crystal fiber being designed to have at least a passband in the IR spectrum and being filled with a molecular gas for triggering at least one Stoke's shift in the light entering the at least a section of hollow core photonic crystal fiber for the particular power of the pump laser, the at least one Stoke's shift be selected to cause the light entering the at least a section of hollow core photonic crystal fiber to shift in frequency into the passband in the IR spectrum of the hollow core photonic crystal fiber.

17 Claims, 5 Drawing Sheets

OTHER PUBLICATIONS

Agrawal, G.P., et al., *Nonlinear Fiber Optics*, Chapter 8 (1989).

Benabid, F., et al., "Stimulated Raman Scattering in Hydrogen-Filled Hollow-core Photonic Crystal Fiber," Science 298, 399 (2002).

Jain, R.K., et al., Appl. Phys. Lett. 31,89 (1977).

Limpert, J., et al., "High Power Air-clad large mode area photonic crystal fiber laser,"Conference and Laser and Electro-optics, CTHPDB8 (2003).

Ouzounoiv, et al., "Researchers report a photonic-band gap fiber that can transmit megawatt pulse," Science, 301, 1702 (2003).

Pask, H.M., et al., "Ytterbium-Doped Silica Fiber Lasers: Versatile Sources for the 1-1.2 μm Region," IEEE Journal of Selected Topics in Quantum Electronics 1, 2-13 (1995).

Platanov, N., et al., "400 W low noise single mode CW ytterbium fiber laser with an integrated fiber delivery," Conference and Laser and Electro-optics, CTHPDB9 (2003).

Rockwell, D., et al., "Wavelength Conversion by Stimulated Raman Scattering," *Physics of New Laser Sources*, pp. 411-445 (1985).

Stentz, A., et al., "Applications of Raman Lasers and Amplifiers in Fiber Communication Systems," Proceedings of SPIE vol. 3263, 91-94 (1998).

Suzuki, K., et al., "Optical Properties of a low loss polarization maintaining photonic crystal fiber," Opt. Exp. 9, 676 (2001).

Temelkuran, B., et al., "Wavelength-scalable hollow optical fibers with large photonic bandgaps for CO2 Laser Transmission," Nature 420, 650, (2002).

\* cited by examiner

COMPACT, TUNABLE, EFFICIENT IR LASER AND IR GUIDING SILICA FIBERS

RELATED APPLICATIONS

This application claims the benefit of U.S. Provisional Patent Application No. 60/885,875 filed Jan. 19, 2007, the disclosure of which is hereby incorporated herein by reference.

This application is related to the disclosure of U.S. patent application Ser. No. 11/231,261 filed Sep. 19, 2005, the disclosure of which is also hereby incorporated herein by reference.

TECHNICAL FIELD

This invention, in one aspect, is directed to a compact, tunable, efficient infrared (IR) laser. The disclosed laser uses a single-mode or multi-mode, hollow-core photonic crystal fiber (HC-PCF) as a guiding structure for a passive, tunable, wavelength converter via Stimulated Raman Scattering (SRS), in conjunction with a tunable laser as the pump. The tunable pump laser may be of a conventional design, for example, it may be a conventional tunable fiber laser. In another aspect, the invention is directed to silica fibers and how they may be designed so as to be transmissive in the IR regime (with wavelengths in the range of about 3 to 12 μm). Additionally, the invention may be used as a Raman amplifier, which can be used to amplify a probe beam or an image-bearing beam.

BACKGROUND OF THE DISCLOSURE

Hollow-core photonic crystal fibers (HC-PCFs) are known in the prior art. See FIGS. 1a and 1b which depict end views of known HC-PCFs. FIG. 1a is an end-view of a HC-PCF, reproduced from article in Science cited below while FIG. 1b is image reproduced from University of Bath Website. Note that the gas volume is very small (scales are on images) and that the structure of FIG. 1b has a large space-to-glass ratio. In neither case can the outer diameter of fiber be seen.

HC-PCFs have been shown to guide optical beams in the visible light regime via Bragg Reflection (BR) at a core/cladding interface along their structure, as opposed to conventional optical fibers that guide light via total internal reflection (TIR) along the core-cladding interface. This property enables the HC-PCF fiber to guide light down its core, whose refractive index can be less than that of the cladding, even a gas or vacuum. Owing to the guided-wave nature of these fibers, the hollow core of the fiber can be filled with a variety of low or high refractive-index states of matter, including gases, cryogenic liquids ($LN_2$), or critical-point media (ethane, Freon 113). By using such fibers, long interaction lengths can be realized that can far exceed lengths typical of free-space, focused media. This enables nonlinear optical interactions to be observed for laser powers not previously possible in short-interaction-length geometries.

The emergence of the HC-PCF enables one to realize SRS with materials that can now be configured into long interaction lengths. Such a device can service new wavelength regions (UV through the IR) as well as power-scalable lasers and optical amplifiers. In addition, now-classic SRS interactions can now be made practical for a variety of applications, including wavelength-agile laser communication devices, remote sensors, IRCM sources, etc. Prior to this guided-wave structure (the HC-PCF), SRS using waveguide geometries were constrained to materials with a refractive index greater than that of the cladding material of the guide (typically, glass), thus limiting such devices to doped glass cores and high-index liquids in lightpipes, such as $CS_2$-filled capillaries. These nonlinear media have several limitations including competing nonlinear interactions, such as self-phase modulation, self-focusing, photochemical degradation, Brillouin scattering, and optical breakdown. Gases typically have higher thresholds for these competing effects. With such gases as $H_2$, $D_2$, or $CH_4$, one can nearly span the entire near-IR to mid-IR range and beyond (2 μm to >14 μm) using either several Raman shifts in a single gas, or cascaded Raman shifts through a $SiO_2$ fiber, in series with different candidate gases or other non-linear media, combined in a single, or separate fluid-filled HC-PCF sections.

The approach disclosed herein enables relatively high wall-plug efficient sources and optical amplifiers to be realized (≈3%), which is a factor of 20 times greater than prior art approaches. In addition, the approach disclosed herein enables room-temperature systems to be fielded, which can be either pulsed or continuous-wave, thereby opening up new classes of devices to service myriad applications. The disclosed tunable system can be scaled to many watts of single-mode, diffraction-limited output, or high-gain beam and image amplifiers.

The prior art includes a variety of Raman lasers, typically using gases, in free-space configurations, which involve focusing of optical beams into relatively short cells, filled with gases. Since the interaction lengths are typically on the order of μm to mm, and the laser beam waist is on the order of several μm, the SRS threshold is on the order of MWatts of peak laser power. This follows, since the SRS threshold scales requires G=g·I·L≈20, where G is the SRS gain (where g is dependent on the specific gas or other states of matter), I is the laser intensity, and L is the interaction length. In applications where the disclosed Raman device is used as an amplifier, the gIL can be less than 20.

SRS has also been observed in guided-wave structures, such as conventional fibers (glass-based core and cladding). Given the long interaction lengths possible, SRS can be observed with relatively low laser powers and applications of low-noise, high-gain SRS amplifiers are typical in the telecom industry.

Research in the past has also involved liquid-filled capillary tubes, which can serve as a guided-wave structure, so long as the liquid (e.g., $CS_2$) has a refractive index greater than the glass, as well as hydrogen-diffused glass fibers. These approaches are not very practical, owing to the competing nonlinear optical effects in glass and liquids (self-focusing, self-phase modulation, SBS, photochemical degradation, and laser-based optical breakdown). Also, the refractive index constraint (n≧1.5), severely limits the candidate liquids. In the gas-diffused case, the shelf-life, stability and diffusion-limited hydrogen density limits the utility of this approach to that of academic interest.

The emergence of HC-PCFs has enabled researchers to now employ gases (such as $H_2$) as Raman active media, and a demonstration of Raman conversion using a pulsed laser at visible wavelengths to a Raman-shifted or Stoke's-shifted output, also in the visible, has been published at visible wavelengths. See F. Benabid, J. C. Knight, G. Antonopoulos, and P. St. J. Russell, "Stimulated Raman Scattering in Hydrogen-Filled Hollow-Core Photonic Crystal Fiber", *Science* 298, 399 (2002). In another demonstration, the ability of HC-PCFs to enable high-peak power propagation of short pules over long HC-PCF lengths with minimal pulse duration was demonstrated at telecom wavelengths. Specifically, a Xe-filled, single-mode HC-PCF was used to demonstrate high-peak power pulsed laser propagation over long lengths while maintaining a high potential communication bandwidth. Dimitre Ouzounoiv, et al., "Researchers report a photonic-band gap fiber that can transmit megawatt pulse," Science 301, 1702 (2003).

The approach disclosed herein employs the following embodiments, which are not believed to have been previously discussed in the literature: This disclosure employs a near-IR, tunable fiber laser as the pump, coupled with a gas-filled HC-PCF specially designed to have a bandpass of at least 300% (say, from 1 µm to >3 µm) to access the IR to mid-IR and long-IR wavelength regions of the spectrum, as well as the incorporation of cascaded HC-PCFs, each with different gases, and each with a sequentially longer wavelength photonic crystal bandpass. Optionally, the sequential HC-PCFs may be composed of different materials (e.g., a solid $SiO_2$ core, followed by HC-PCFs using $SiO_2$ and $As_2Se_3$) to enable low-optical-loss guiding at progressively longer wavelengths, or the sequential HC-PCFs may be composed of a mix of cascaded HC-PCFs, with different gasses and/or different solids of the type just mentioned. Finally, the approach disclosed herein employs a tunable fiber pump laser to realize tunability across most of the IR spectrum. In addition, these systems can be used as single beam or image amplifiers using single-mode or multi-mode HC-PCFs, respectively. As noted, none of these notions appear to be discussed in the literature.

The present invention is not obvious in view of the prior art. The prior art does, indeed, describe and demonstrate SRS in the visible light spectrum in a single section of a $H_2$-filled HC-PCF, using a pulsed laser as a pump. However, there is no discussion or suggestion of which we are aware of how to configure fibers and/or fiber materials to realize a desired output in the IR. In the present disclosure we consider, in general, multiple Stoke's-shifted beams to arrive at the desired output wavelength range. More specifically, in the prior art, there is no discussion of variants (that are described in this invention) of fibers and nonlinear media to realize the desired output and its properties. This includes, as an example, a cascaded series of fiber sections, with each fiber section consisting of a different core material (a solid core in one case, and various gas fills and/or pressures, either in a single fiber section or in sequential sections), different photonic bandgap structures in each section, different core sizes, different photonic crystal matrices, different materials (e.g., $SiO_2$, $As_2Se_3$), as well as combinations thereof. In addition, the prior art does not consider the case of a tunable pump laser (in our case, a tunable Yb-doped fiber), which can lead to a tunable IR output beam, with a "magnified tunable range"— that is, a 8% pump-laser wavelength tuning range can result in a 100% tunable Stokes-shifted output wavelength range. Finally, by frequency modulating the pump laser, a Raman-shifted output beam can result in a "magnified" FM modulation deviation. The prior art simply deals with a single Stoke's shifted output beam, using a fixed wavelength, pulsed pump laser.

BRIEF DESCRIPTION OF THE INVENTION

In one aspect an IR laser source for providing light in the IR spectrum is disclosed which includes a pump laser operating at a frequency equivalent to wavelength shorter than 2 µm and at a predetermined power and a single-mode or multi-mode optic fiber coupled to the pump laser. The optic fiber has at least a section of a hollow core photonic crystal fiber, at least a section of hollow core photonic crystal fiber being designed to have at least a passband in the IR spectrum and being filled with a molecular gas for triggering at least one Stoke's shift in the light entering the at least a section of hollow core photonic crystal fiber for the particular power of the pump laser, the at least one Stoke's shift be selected to cause the light entering the at least a section of hollow core photonic crystal fiber to shift in frequency into the passband in the IR spectrum of the hollow core photonic crystal fiber.

DETAILED DESCRIPTION

In the following discussion we first describe gas-filled HC-PCFs as Raman shifters, which is a preferred embodiment. This is followed by a brief discussion of planar photonic crystal guided-wave structures, immersed in gas, as yet another embodiment to realize Raman shifting in a compact configuration.

Gas-Filled, Hollow-Core Photonic Crystal Fibers (HC-PCFs) as Raman Shifters

Figure 1A:
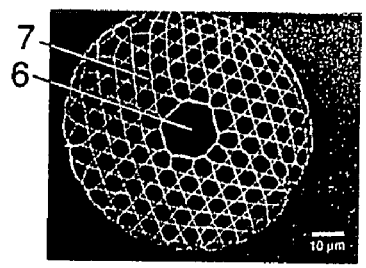
FIG. 1a is an end view of a prior art HC-PCF made by Banabid.

Although obviously not as compact as direct semiconductor sources, well-designed all-in-the-fiber lasers and HC-PCF SRS devices have few or no alignment-sensitive ordinary optics, have simple electronic infrastructure with no cryogenics, can be modulated with minimal loss in efficiency to provide optimal waveforms for myriad remote sensing applications, such as photo-acoustic detection, and are readily packaged, similar to ordinary electronics. We describe two different approaches herein, all involving Raman-induced wavelength conversion, from fiber lasers (such as a Ytterbium-doped fiber laser which typically operates in the range of about 1.05 µm to about 1.12 µm) to the IR. The first, lower-risk approach utilizes photonic crystal fibers, which can be gas-filled because light is guided by the periodic structure (i.e., by Bragg reflection inside the periodic structure surrounding the central core of a HC-PCF) rather than by total internal reflection (TIR) from a refractive index profile (as is the case with conventional solid core optic fibers), and the second is enabled by advances in microphotonic structures, which have been fabricated with very high Q. In FIG. 1a, the periodic structure comprises the relatively small annular tubes which surround the central open core. When immersed in a gas, the gas flows or permeates into both the central core and the surrounding periodic structure. The sizes of the relatively small annuluses in the periodic structure are governed by a desire to maximize the HC-PCF's reflectivities of the periodic structure at the pump wavelength and, particularly when used to guide light in a frequency range (such as IR) for which the material of the period structure of the HC-PCF fiber 10 (often glass) is absorptive.

In the first embodiment, a hollow-core photonic crystal fiber (HC-PCF) 10 filled with a suitable SRS-active molecular gas (or, gases) for generating Stoke's (or Raman) shifts in the light applied to the fiber 10. The fiber 10 is preferably coiled up and placed inside a sealed gas cell 12 (which may comprise a cylindrical housing, as is better seen in FIG. 3, or any other convenient shape), with optically transparent end caps 14 or the gas may be placed (and sealed) within the hollow interiors of the HC-PCF fiber 10 so that the coiled HC-PCF 10 need not necessarily be placed within a separate gas cell 12 as shown. When the HC-PCF fiber is made of glass, coiling of the fiber 10 is easily done. Bending losses are minimal, owing to the tight confinement of the guided mode in the fiber 10. The fiber 10 is disposed or mounted in the cell 12 so that each end of the fiber 10 is visible from via a respective transparent end cap 14. In the way, light from the pump laser 18 can be coupled into one end of the fiber 10 by focusing it (or just applying it) through one its end caps 14, while the Raman-shifted output (assumed to be in the forward direction) emerges from the other end cap 14. The material for the end caps is selected to be transparent for a given range of wavelengths, and may be different for the input and output end caps 14 given the fact that frequency shifting and wavelength tuning is intended to occur in the fiber 10 in the cell. For example, a glass end cap may be used at the input side and a ZnS or ZnSe flat may be employed at the output end.

Figure 2:
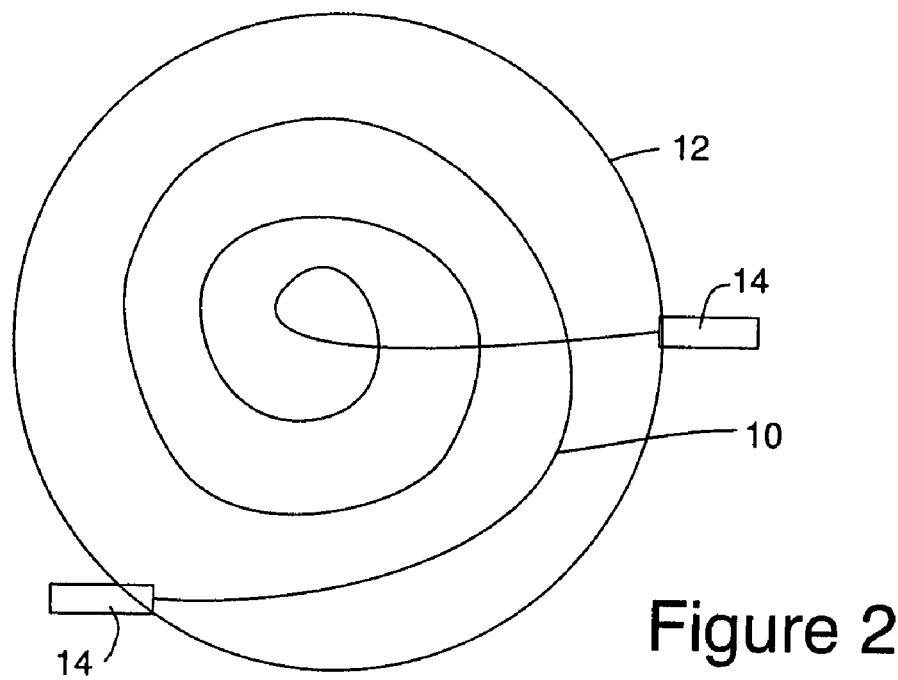
FIG. 2 is a view of a coiled, gas filled HC-PCF in sealed container.
Figure 3:
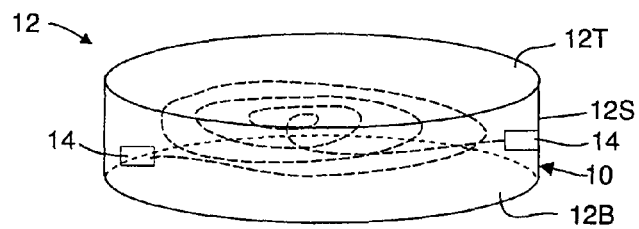
FIG. 3 is a perspective view of the embodiment of FIG. 2.

The windows (e.g. end caps) 14 may be AR coated, if desired, to minimize spurious reflections and parasitic oscillation modes. Since the light couples directly into the gas-filled fiber 10, there will be minimal chance for optical damage or breakdown at the input end of the fiber, since there need be no material/air interface. Since the entire fiber 10 is contained in the cell 12, there should be no differential pressure difference between the pressure of the gas in the gas-filled core and the fragile, thin-walled photonic crystal matrix (or periodic structure) that surrounds it. The fiber 10 is designed to be single transverse mode for both the pump and the Stoke's-shifted output to ensure optimal modal overlap between the pump and wavelength-shifted output beams. Since subsequent Stoke's-shifts may be necessary for yet additional wavelength conversion (as described below), subsequent Raman fiber sections can be designed to be single-transverse mode for the input and output beams of that given Raman conversion stage in the system. In some cases, it may be desirable to have small gas cells at each end of the fiber (instead of a single cell as shown in FIGS. 2 and 3), but, this is not considered to be the preferred embodiment, since the fiber may be exposed in the region between the two end cells. The fibers and HC-PCFs can be designed to be multimode in the case of an image-bearing beam.

Figure 4:
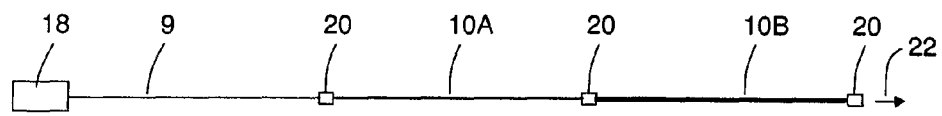
FIG. 4 depicts an embodiment of the showings a series of HC-PCF fibers (two in this embodiment), which are connected in series with a solid core silica fiber, and a laser source.

A series of Raman-shifted HC-PCF fiber sections 10A, 10B and 10C may be serially connected as shown in FIG. 4. Indeed, depending on the frequency of the laser 18 utilized as a light source to the serially connected fiber sections 10A-10C, a non hollow core silica fiber 9 may be utilized between the source 18 and a following HC-PCF fiber section 10 (or a series of sections 10A . . . ). For example, if the laser is a tunable (from 1.05-1.125 µm) ytterbium fiber laser 18, the Stokes-shifted output of the solid core fiber 9 will be about 1.9 µm. Since a solid core silica fiber still has good transmission qualities at that frequency, there is no need, in such an embodiment, to use a Raman-shifted HC-PCF fiber section 10 as the first Raman-shifted fiber section. But when the Raman shifts get beyond the frequencies where silica has good transmission qualities, using Raman-shifted HC-PCF fiber sections 10 become very important. Of course, other lasers, including laser diodes, may be used as the pump laser 18.

Figure 1B:
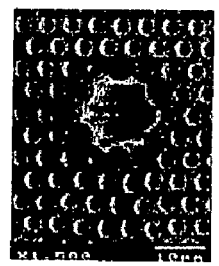
FIG. 1b is an end view of a prior art HC-PCF made at the University of Bath.

By launching a ~1 µm tunable fiber laser 18 into the fiber, and by using two or more Stokes shifts, either in cascades HC-PCFs 10A . . . or in a single HC-PCF fiber 10, tunable sources (that is, the outputs of the one or more HC-PCF fibers 10) between 3 µm and 12 µm can be realized, as our calculations predict. We are encouraged by the fact that workers at the University of Bath recently demonstrated first-Stokes Raman scattering in $H_2$-filled glass HC-PCFs as shown in FIG. 1b. See E Benabid, J. C. Knight, G. Antonopoulos, and P. St. J. Russell, "Stimulated Raman Scattering in Hydrogen-Filled Hollow-Core Photonic Crystal Fiber", *Science* 298, 399 (2002). It is well known that fused silica has very large optical absorptions starting in the mid-IR. However, considering that the lowest-order guided mode in the HC-PCF resides primarily in the hollow central core region, coupled with the fact that the photonic crystal wall thickness is typically a very small fraction of the air/wall periodic structure, we have confidence that the actual loss (at least in the near-IR spectral region) will be tolerable. This is a valid expectation, given that the Raman gain can be in the range of 30 dB in the gas, coupled with the fact that the Benabid data does not show any absorption trend in the region of 1 to 1.6 µm (on the order of 1 to 3 dB per meter), with the spectral region limited by the range of their spectrometer.

The pump laser 18 can be modulated using convention modulation schemes, including AM, FM, PM, etc), and the output of the fibers 10A-10C will be similarly modulated. The deviation of the pump laser 18 should be selected such that the frequency deviation in each section 10A-10C remains in the passband of each fiber.

It may be thought that the bandgap will not be sufficiently broad to allow transparency over the desired region of operation (=1 to 14+µm). It is true that researchers have calculated bandgaps on the order of 50% bandwidth (as opposed to ≈700% that would be ideal in the present case). However, there are three notions that can provide solutions to this apparent limitation.

First, the measured bandgap by Benabid revealed a transparency region from about 4.00 nm to 1600 nm, representing a 400% bandpass (again, limited by the range of their spectrometer). Although their hollow-core guide may not rigorously be an ideal photonic crystal structure, nevertheless, their results are valid. In fact, it appears from FIG. 1b that their structure may possess some chirping in the Bragg grating period over the radius of their fiber matrix. It is well known that a chirped grating enables one to extend the Bragg condition over as greater wavelength region (at the expense of Bragg reflectivity). Since the allowed spectral bands of the photonic bandgap is a scalable quantity (i.e., the 400% figure), then, assuming low loss in $SiO_2$ further into the IR, one can design the structure to be transparent from, say 1 µm to about 4 µm, which would be satisfactory for at least one half of the desired spectral output band of interest. In this case, a cascaded set of HC-PCFs, each with a different bandpass, core size, and matrix material can be fabricated to cover the entire region of interest.

The second notion pertains to the fact that it is not a requirement that the fiber be transparent over a continuous wavelength region to be practical. Indeed, for certain applications, it need only be transparent over the output regions of interest, since the Raman shift is a fixed change in wavelength, so that, in essence, the shift can "hop" from one bandgap region to another bandgap region in the same HC-PCF, even though an undesirable region with low transmission may exist between the input and output photon wavelength bands.

Finally, the third notion pertains to a discussion (Mar. 13, 2004) by one of the inventors herein, David Pepper, had with Professor Amnon Yariv of Caltech on the general topic of HC-PCFs. He advised Dr. Pepper that he was working with Crystal Fibre (a Danish company that manufactures HC-PCFs) to produce PCFs using a matrix with concentric, annular walled regions to form radial Bragg planes (as opposed to the Kagone matrix structures employed by Benabid and others). This new structure fabricated with transparent HC-PCF material should possess ideal photonic bandgaps with >600% bandpass in the visible to near IR spectral range, in accordance with theoretical simulations according to Professor Yariv. Thus, an alternative structure of a HC-PCF may become available in the future for practicing the present invention. In any case, even using existing structures of HC-PCFs, a cascaded set of sequential HC-PCFs should be adequate to reduce to practice this technique.

In any case, it is important to note that, regardless of the approach taken for this disclosure, the use of silica optic fibers for at least the initial portion of the system is reasonable, since their fabrication technology is well advanced. Since silica fibers are not hollow, a coil of solid core optical fiber may immediately proceed the first stage. Our confidence is also buoyed because low-loss (<1 dB/m) photonic bandgap hollow fibers have been fabricated from high-loss—e.g. >10 dB/m $As_2Se_3$ and >105 dB/m poly(ether sulphone)—materials. See Burak Temelkuran, Shandon D. Hart, Giles Benolt, John D. Joannopoulous and Yoel Fink, "Wavelength-scalable hollow optical fibers with large photonic bandgaps for $CO_2$ laser transmission," Nature 420, 650 (2002). PCFs are inherently designed to have minimal evanescent fields in the glass, which furthermore constitutes only a very small fraction of the guiding structure. If fused silica HC-PCFs nevertheless proves to be too lossy beyond 4 µm, then, HC-PCFs fabricated of chalcogenide materials, which have been demonstrated at MIT (hollow bandgap polymer/chalcogenide fiber carrying 1-2 W of 10.6 µm laser power, courtesy Y. Fink, S. Hart, et al. of MIT), can provide a solution for transparency into the mid-IR and beyond. Thus, HC-PCFs fabricated with such chalcogenide materials, and, employing a matrix structure similar to that of Benabid, should therefore provide broadband transparency, with minimal (acceptable) loss over the longer IR spectral region of interest and can hence form the final Raman shifting stage of a cascaded set of Raman-based wavelength converters.

Planar Microphotonic Photonic Bandgap Structures Immersed in Gas as Raman Shifters Yet another method to realize a Raman shifting device is to employ a microphotonic structure 22, placed in a Raman-active environment. See FIG. 2a. As an example, planar micro-resonator structures, such as a III-V photonic crystal 22 immersed in a Raman-active gas inside a cell 12 also offer, if they can be fabricated with high Q, a potentially efficient method of SRS conversion. Since such a structure has yet to be demonstrated, this embodiment is considered speculative compared to the HC-PCF approach described above (and below). These planar micro-resonators 22 can be fabricated using III-Vs (e.g. GaAs, InP), which are highly transparent, isotropic, and possess a high refractive index (~3) throughout the infrared pump and Stokes wavelengths regions of interest. The lithography scale sizes required (sub mid-IR wavelengths) is well within the current state-of-the-art relative to other microelectronic processing needs. They are a higher risk technology but offer the additional advantage (over fibers) of being smaller chip-scale devices. Here we are encouraged by the results from work at Caltech as discussed with us at HRL Laboratories in 2001. Several variations can be considered. In the literature, a variety of novel structures have been fabricated using a "pegboard" pattern of photo-lithographically formed posts (order of a optical wavelength) as well as novel micro-resonators, such as "racetrack" patterns and micro-spheres. In the former case, guided-wave resonators have been fabricated and demonstrated with high values of Q (1,000 to >million). In the latter case, Q's in the range of 10 million have been demonstrated as well as low-power CW Raman scattering in 50 µm-diameter glass beads (in this case, the Raman shifting occurs in the solid bead material, $SiO_2$). In general, all such high-Q structures can be immersed in high-pressure cells 12 containing the Raman active gas(es) of choice, along with optical access (windows 14) for the input pump beam from laser 18 and the output Stoke's-shifted beam. The Raman medium will be the gas in the cell 12, instead of the solid material comprising the silica bead. Since the entire semiconductor structure is highly transparent, one can couple the pump beam from the pump laser 18 and the Raman-shifted output beam from either the front or the back-side surface of the photonic crystal planar structure 22. In the latter case, since the structure is transparent to both the pump and wavelength-shifted light, Bragg grating couplers fabricated on the back-side of the substrate can be employed for ease of coupling the various beams. This general approach is not as desirable as the HC-PCF embodiment, since the index difference between the planar structure (e.g., a III-V semiconductor, such as GaAs or InP) and the gaseous background is large. Therefore, the guiding mode will have a relatively small field amplitude that extends beyond the material into the gas. Hence, the effective intensity will be correspondingly low in the Raman medium. However, given the high Q of the structure, the effective interaction length will be very large. Hence, as long as the nonlinear gain (gIL) exceeds threshold, the Raman process can, indeed, be efficient. But this structure may prove more difficult to build than the HC-PCF embodiments discussed herein.

Figure 2A:
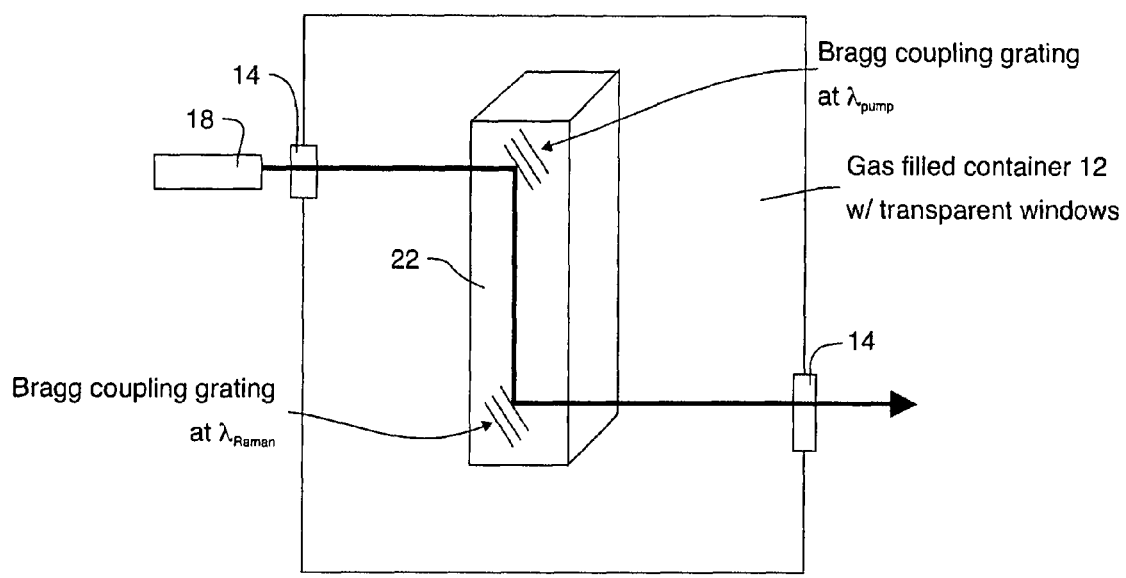
FIG. 2a is a view of a planar micro-resonator photonic bandgap structure with Bragg couplers fabricated thereon, the structure being disposed in sealed, Raman gas filled container.

The planar micro-resonator structure 22 shown in FIG. 2a could be used in combination with the HC-PCF embodiments. For example in FIG. 4, the Raman frequency shifting device shown in FIG. 2a could replace one of the fibers shown therein, particularly optional fiber 9 shown in FIG. 4.

Technical Discussion

SRS is an inelastic scattering process in which photons at a laser wavelength (called the pump) are converted to photons at another wavelength with a fixed energy shift, determined by the vibrational or rotational modes of the Raman medium. SRS in fused silica fibers is well understood. See Govind P. Agrawal, *Nonlinear Fiber Optics*, (Academic Press, Boston, 1989), Chapter 8. SRS in fused silica fibers has recently matured quickly to become the method of choice for near-quantum-limited efficient wavelength conversion and signal amplification for the telecommunications industry. Because fused silica is opaque beginning in the mid-IR, and because the SiO bond's vibration produces a Raman shift of only 440 cm$^{-1}$, increasable with lighter-atom glass modifications to at most ~700 cm$^{-1}$, solid fibers are incapable, even with multiple Stokes shifts, of accessing the mid-IR. As detailed below, HC-PCFs solve these problems.

The most efficient fiber laser sources 18 are Yb-doped fibers, which are tunable from at least 1.05 to 1.10 µm, and have demonstrated multi-hundred-Watt powers. See H. M. Pask et al., "Ytterbium-Doped Silica Fiber Lasers: Versatile Sources for the 1-1.2 µM Region", IEEE Journal of Selected Topics in Quantum Electronics 1, 2-13 (1995). Given this choice of pump laser wavelength, relatively large Raman shifts are required to wavelength-shift into various regions in the IR—~7,300 cm$^{-1}$ to access the 5-7.5 µm mid-IR band, and ~8,300 cm$^{-1}$ to access the 9-11 µm IR band—which are most readily achieved using gases, in which the engineering of efficient—again close to the quantum limit—conversion is well understood. See David A. Rockwell and Hans W. Bruesselbach, "Wavelength Conversion by Stimulated Raman Scattering," in *Physics of New Laser Sources*, Edited by Neal B. Abraham, F. T. Arecchi, Aram Mooradian, and Alberto Sona (Plenum Publishing Corporation, 1985), pp 411-445.

Figure 5:
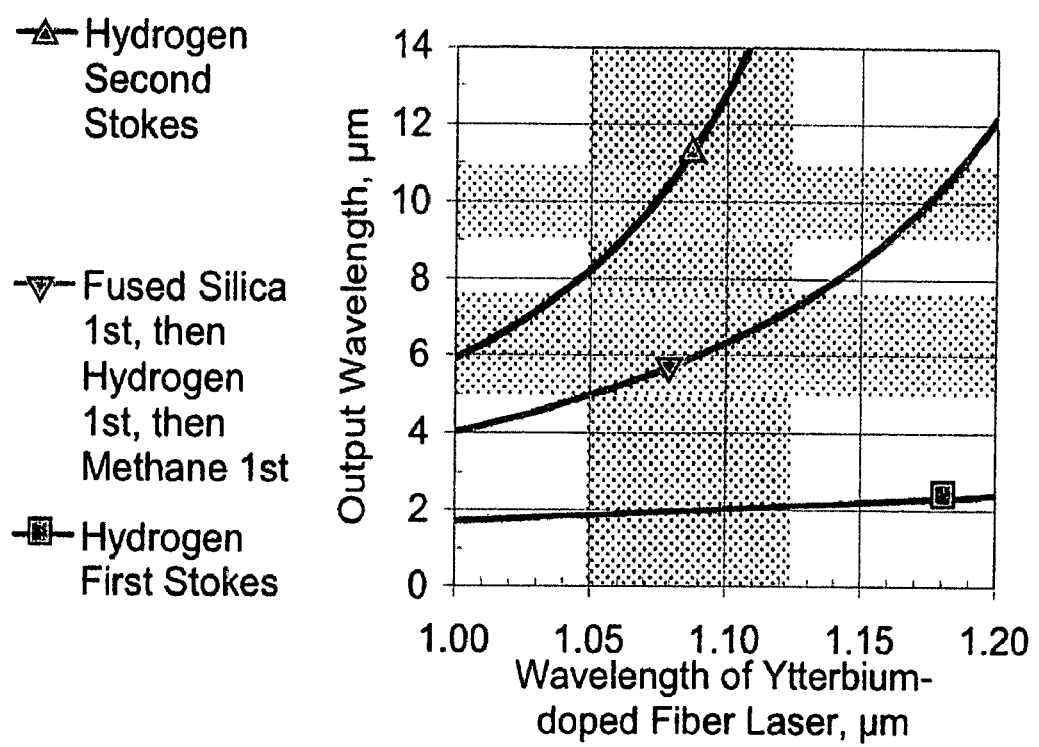
FIG. 5 is a graph depicting the theoretical results for three embodiments of laser coupled HC-PCF fibers with SRS for frequency shifting into the IR range using a ytterbium-doped fiber laser as the light source (which is tunable over the range of about 1.05 to 1.25 µm). The top graph shows the expected results of using a single HC-PCF fiber filled with $H_2$ gas and having a length and laser power such that light with two Stoke's shifts would appear at the output end of the single HC-PCF fiber. The middle graph shows the expected results of using an arrangement such as that shown in FIG. 4 where the first fiber 9 is a solid core fiber (with length/power such that a single Stoke's shift would occur), the second fiber is a single HC-PCF fiber filled with $H_2$ gas and having a length and laser power such that light with one Stoke's shift would appear at the output end of the second fiber and the third fiber is a single HC-PCF fiber filled with $CH_4$ gas and having a length and laser power such that light with one Stoke's shift would appear at the output end of the third fiber. The bottom graph shows the expected results of using a single HC-PCF fiber filled with $H_2$ gas and having a length and laser power such that light with one Stoke's shift would appear at the output end of the single HC-PCF fiber.

As is portrayed graphically in FIG. 5, both bands can be accessed using no higher than the second Stokes shift of the best known Raman-active gases, namely $H_2$ and $CH_4$ (or $D_2$), in one or more series-connected HC-PCF fibers 10 and preferably also a single Stokes shift in an ordinary fused silica fiber 9. For clarity, we have only shown conversion to the bands of most interest. Other wavelengths can be accessed via different combinations of shifts. For example, wavelengths near 3 µm can be obtained via the second Stokes shift of $CH_4$, and wavelengths beyond 15 µm can be obtained by shifting in fused silica before the second-Stokes $H_2$ shift. Although this may be thought of as a gas laser, note that the gas volume is very small, and quite passive. Heat is deposited in the gas, in similar quantities as the heat left in ordinary fiber lasers. An acknowledged feature of fiber lasers, of great appeal in commercial applications, is that their large surface-area-to-volume ratio has made thermal management a non-issue for most products. Subsequent photonic crystal structures can enable Raman amplifiers and sources at even longer wavelengths, including the THz range and beyond.

FIG. 5 provides a summary of some wavelengths accessible via Raman conversion of a tunable (from 1.05-1.125 µm) ytterbium fiber laser. The vertical black-stippled band is the tuning range of a ytterbium laser (including, if necessary, ±50 cm$^{-1}$ tuning of the fused silica Raman shift), and two horizontal stippled bands reflect the two desired Raman-shifted output bands.

As described by Rockwell and Bruesselbach in the above-cited reference, SRS is a third order nonlinear process, so has a gain given by gIL, where g is a materials parameter, I is the intensity in the interaction region, and L is the length of the interaction region. Threshold usually occurs for gIL≈20, and conversion efficiency rapidly grows to the quantum limit at higher intensities. Before fibers and HC-PCFs made low-loss guiding possible in gasses, focused beams were used and the gain was constrained by diffraction; SRS was considered a high peak power phenomenon and Q-switched or mode-locked lasers were needed to achieve the necessary intensities.

SRS at low pump power and over long interaction lengths was demonstrated in conventional (solid-core) fibers and has been investigated long ago (some of the early work was at HRL Laboratories—see R. K. Jain et al., *Appl. Phys. Lett.* 31, 89 (1977)). Because of the favorably high (>50%) efficient conversion, in five SRS steps from an input of 1.1 µm to a final output of 1.5 µm can readily be obtained. See Andrew J. Stentz, "Applications of Raman Lasers and Amplifiers in Fiber Communication Systems," invited talk in *Nonlinear Optical Engineering*, Metin S. Mangir, Editor, Proceedings of SPIE Vol. 3263, 91-94 (1998). This technology has subsequently been employed extensively, with standard commercial products now available, for the telecommunications industry. However SRS at low power in gases has simply not been possible because high-loss metal or dielectric guides, relying on grazing incidence instead of Bragg reflection, were the only available structures. An important aspect of HC-PCFs 10 is that they enable low-loss, guided-wave propagation over long effective interaction lengths in materials having lower refractive index than the cladding, specifically in our case of SRS-active gases. PCF structures are fundamentally different from ordinary fibers in that they utilize the periodicity of the structure rather than total internal reflection (TIR) from refractive index profiles for their guiding. The core-cladding interface can be viewed as a Bragg reflecting region along the length of the fiber. The photonic structures can be engineered to have low loss at specific wavelengths, or quite wide bands of wavelengths, or a large range of angles, using software available from MIT under the name Photonic-Bands. MIT offers a download of the photonic-bands package (MBP) which features fully-vectorial, three-dimensional calculation. Iterative eigensolver techniques are employed to make large, three-dimensional calculations possible. It can be downloaded at present using http from //ab-initio.mit.edu/wiki/index.php/MIT_Photonic_Bands. We used version 1.4.2 of the MIT Photonic-Bands code in our calculations.

The intensity in the Raman gain=exp(gIL) formula is determined by how small the hollow fiber core can be designed to be (on the order of several wavelengths in diameter), and the length can be many meters, because guiding losses are small (~1 dB/km for solid fused silica, <0.3 dB/m for Benabid et al.'s HC-PCF, and less than <1 dB/m for Temelkuran et al.'s structure noted above). Benabid observed threshold at only ~130 W (0.8 µJ, 6 nsec pulses) and used ~250 psi $H_2$ gas (for which g=2.64 cm/GW at 532 nm) in a ~15 µm diameter guide (shown in FIG. 1) corresponding to the product of gIL≈20.

Tunable kilohertz linewidth ~100 mW fiber lasers are commercially available off-the-shelf from NP Photonics In. These can be amplified to tens of watts using commercially available fiber amplifiers of Keopsys Inc. Note that hundreds of watts from Yb fiber lasers have been demonstrated in several laboratories (see Jens Limpert et al., "High-power air-clad large-mode-area photonic crystal fiber laser," Conference on Lasers and Electro-optics (CLEO) postdeadline paper CTH-PDB8 (2003) and Nikolai Platonov et al., "400 W low-noise single-mode CW ytterbium fiber laser with an integrated fiber delivery," Conference on Lasers and Electoopics (CLEO) postdeadline paper CTHPDB9 (2003)). Note also that multiple lines can be obtained by simply amplifying several sources, with each individually tunable. Using the gIL formula, it is readily calculated that a 10 µm-diameter, ten-meter long guide, pumped at 1 µm, would reach Raman threshold at only ten watts. This sounds very promising, but several other design considerations must be taken into account. The Raman gain falls inversely with wavelength, so proportionally higher intensities and lengths are required for the higher Stokes shifts from the shifted wavelengths.

Because gases possess very low refractive index compared to glass ($\approx$1 vs. 1.5), competition from most non-linear optical $\chi^3$ effects troublesome in fibers (e.g., self phase modulation) is greatly suppressed. However, competition from stimulated Brillouin scattering (SBS) is always an issue. The usual way to deal with this is to modulate the source laser to increase its linewidth. The Brillouin linewidth, which is inversely proportional to the pressure, is on the order of tens of megahertz at 250 psi. Thus the Brillouin gain can be considerably suppressed by, for example pulsing the fiber pump laser. As an example, if ~5 nsec pulses are used (at, for example 1 MHz pulse rate, or, in some cases, the repetition rate can be matched to a frequency optimized for a given application, say photo-acoustic sensing, etc.), the laser linewidth is increased to ~200 MHz, which will suppress the Brillouin gain by a factor of ten but still produce an output within the linewidth of typical atmospheric absorption features. Note that the peak intensity of the pump laser is now 200 times higher, which greatly benefits the Raman gain (gIL), especially at the longer wavelengths. Since the Raman gain coefficient (g) is not pressure dependent in its pressure broadened regime, i.e. above one atmosphere, it would also be beneficial to operate the Raman fiber with only a few atmospheres of pressure (in contrast to Benabid, who employed a pressure of about 17 atm), thereby reducing the Brillouin competition further. This would also of course simplify the fiber mounting and sealing, since high pressures do not need to be contained. At low pressure, competition from rotational Raman scattering would be significant; this may be suppressed by using linear polarization and polarization maintaining fibers. Such polarization-preserving fibers have been demonstrated using conventional (solid-core) fibers, as well as holey fibers (also with solid cores). See Kazunori Suzuki, Hirokazu Kubota and Satoki Kawanishi, "Optical properties of a low-loss polarization-maintaining photonic crystal fiber," Opt. Exp. 9, 676, (2001). In our discussions with Crystal Fibre, a polarization-preserving HC-PCF does not present any obvious fabrication challenges.

Note also that several wavelengths may be produced simultaneously by using several fiber seed lasers, each individually tuned. All the seed lasers may be simultaneously launched into the amplifier and the HC-PCF SRS converter. For the power they produce, fiber-based lasers are quite compact devices, on the order of only a few tens of cubic centimeters. They require minimal electronic infrastructure to support them, and no cryogenics or in most cases even active cooling. The gas-filled fiber will not be much larger than an ordinary fiber, particularly if only modest gas pressures are needed and can be integrated into a very small gas-filled volume. Ytterbium fiber lasers are very efficient: electrical-to-optical efficiency for the pump diodes is on the order of 40%, and the ytterbium fiber can be >70% efficient. Raman conversion has been demonstrated at close to the quantum limit, so conversion to ~10 µm can be expected to approach 10% efficiency. This gives the entire laser a wall-plug efficiency of >3% in the desired end-user wavelength regimes. In summary, our compact system can, for all practical purposes, not only emulate an all-chip laser, but, in fact, can be more favorable, given its far higher power, its expected overall wall-plug efficiency, room temperature operation, and compactness. A planar photonic crystal (say, in the form of a III-V micro-resonator or other high-Q structure), in the presence of a Raman-active medium, is a riskier and more far-term approach, but offers true chip-scale integration. Hence, such novel structures have much to offer.

IR Transmitting Properties of Silica Fibers

The following discussion relates to the fact that an important feature of the afore-discussed IR laser is the infrared-transmitting properties of the fibers 10. Indeed, this discussion relates how one can design silica fibers so that stimulated Raman scattering (SRS) can occur in the infrared (IR) region without undue IR absorption. So the ability to design a silica HC-PCF 10 for IR transmission is important as such fibers will find uses beyond those described herein. Indeed, infrared transmitting fibers have many military and commercial applications. Even short pieces of silica fibers with undesirable relatively high attenuation are used today for conveying infrared light to a detector in a Dewar, for example. For many reasons, all-silica fibers should be preferable to the present Chalcogenide technology often used in IR fiber transmission applications.

The idea of using the hollow core silica fibers for SRS in the visible light spectrum is one that exists in the literature. The possibility that hollow core silica fibers 10 could be used in the infrared (where silica is opaque/lossy) is believed to be unknown in the prior art. It is totally counter-intuitive to the technical community to use silica for the transmission of IR light, since, to be practical, it is well known that optical fibers must be fabricated using ultra-low-loss materials at the intended wavelengths of operation. This requirement is the reason that silica fibers are not even considered for practical use at wavelengths longer than about 1.5 µm to 1.9 µm, since silica is highly absorbing at longer wavelengths. This has forced the technical community to consider other, less developed and very costly materials other than silica for fibers at these longer wavelengths, such as chalcogenides. These materials are very difficult to form into long fibers, are not as robust as silica, are brittle, and can suffer from scattering losses. Hence, their use is very limited and is typically used in proof-of-principle demonstrations for short-haul beam delivery at wavelengths greater than 1.5 µm.

Thus, to our knowledge, the use of silica as optical components (fibers, etc.) at these longer wavelengths is never even considered, given how opaque silica is in this wavelength region. However, we have shown that HC-PCFs can, indeed, be fabricated using silica and be practical, even at wavelengths that have high optical losses in the bulk. This follows since the guided optical modes in a HC-PCF reside primarily within the hollow core, which, when filled with certain gases and liquids, can enable ultra-low-loss transmission. Moreover, even if the photonic crystal matrix that surrounds the hollow portion of the fiber is high-loss, the net propagation loss can be sufficiently low to enable practical applications to be realized using HC-PCFs. This follows since a very small fraction of the guided modes interacts with the photonic crystal matrix. Furthermore, since the "fill factor" of the matrix consisting of the lossy material is also very small (i.e., most of the matrix is empty, since the "walls" of the matrix are extremely thin), the optical field amplitude within these thin walls is also extremely low.

In addition to this previously unappreciated notion (low-loss transmission of guided modes at wavelengths opaque to the fiber material), our invention also includes the idea that two or more of the transmission bands of a fiber could be designed to match the several wavelengths involved in the SRS process.

In the planning for reducing the inventions to practice, we decided to first pursue the SRS, and as a first step, to simply characterize the infrared transmission and check it against theory. We needed to design a fiber, and we utilized the aforementioned public-domain MIT Photonic Bands code to design a HC-PCF for use at IR wavelengths. Using our calculations, we commissioned silica-based HC-PCFs from an outside manufacturer, and specified the fiber parameters (photonic crystal dimensions, wall thickness, overall dimensions, etc) per our calculation. At HRL Laboratories in Malibu, Calif., we used these specifically designed fibers in our IR apparatus and interpreted our experiments to measure their transmission characteristics.

As stated above, we designed and then commissioned the fabrication of a photonic crystal fiber that could be used in a reduction to practice of the stimulated Raman scattering (SRS) half of our invention. Calculations of what would be expected from particular designs were carried using the aforementioned computer code available from MIT. The code, as provided by MIT, does not include the possibility that the refractive index of the material from which the fiber is fabricated has absorption, that is to say, it does not allow the refractive index to be a complex number. Thus, the MIT code does not accurately describe the fiber beyond the approximately 2.5 µm wavelength where silica becomes opaque. A code to do the calculation in wavelength regions where silica is absorptive has not yet been developed, to our knowledge, although we incorporated some small amount of attenuation into the model. Since the transmission bands, however, depend mostly on the geometry and physical dimensions of the fiber, especially when the silica webs are thin, we felt that design calculations could still be very useful. In any event, they were the best available information we had for designing the fiber.

Figure 6:
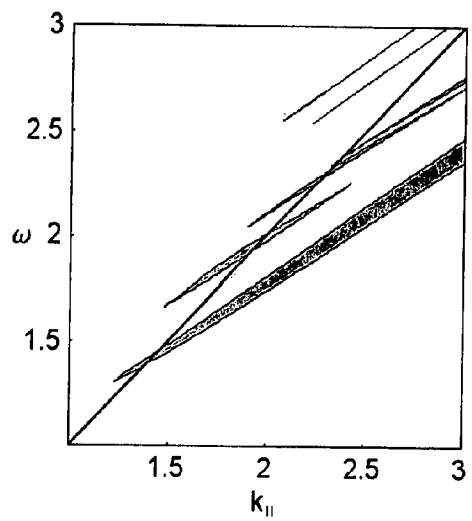
FIG. 6 shows our calculations of the dispersion diagram.
Figure 7A:
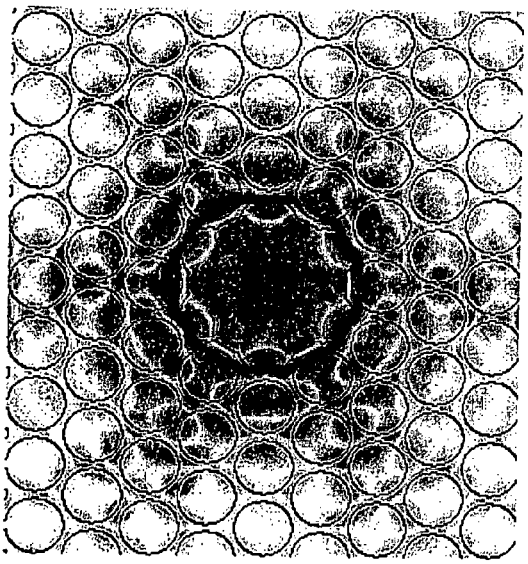
FIGS. 7a and 7b depict results of calibration of the spatial mode pattern for the lowest (FIG. 7a) and next higher modes (FIG. 7b).
Figure 7B:
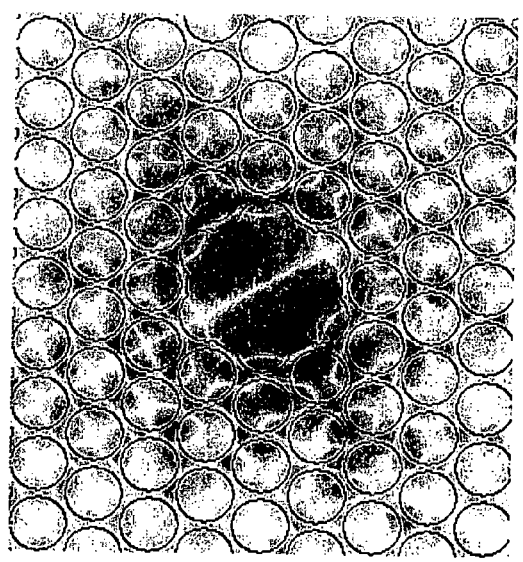

FIG. 6 shows our calculations of the dispersion diagram ($\omega$, vs. k) for a triangular lattice of air holes in fused silica, n=1.46, the radius of the air holes is 0.44·a, where a is lattice constant of the triangular lattice of air holes (i.e. their center to center distances). In FIG. 6, $\omega$ is in units of the speed of light (c) divided by a and k$\mu$ is in units of 1/a, so this figure is independent of the actual value of a. FIG. 6, as well as FIGS. 7a and 7b, represents data obtained using the aforementioned MIT code. The fact that the top line, representing propagation in free space, intersects several of the shaded regions shows that propagation through the structure at defects (bigger holes, assumed to have free-space-like propagation) is possible, in several bands. Mode shapes for the two lowest order modes at one possible transmission band are shown at the right. These calculations show that there is significant electric field amplitude inside the silica, and so these modes would be expected to have significant attenuation as they travel down the guide.

To our knowledge, use of photonic crystal fibers for transmission of light where the silica absorbs has not been reported in the literature, and in fact some publications teach away from this. In FIGS. 7a and 7b (red is positive, blue is negative amplitude, with the intensity of the color proportional to amplitude), it will be seen that there is indeed significant mode amplitude in the glass, so attenuation of modes with the indicated electric field patterns would be expected to be significant.

Figure 8:
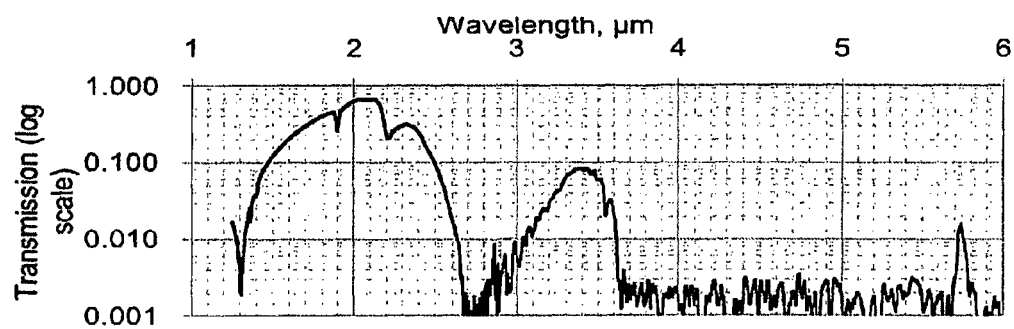
FIG. 8 shows one of the transmission measurements.

However, based on our experience with calculating the reflection from thin film coatings with complex indices of refraction, which may be considered to be one-dimensional photonic crystals, we believed that it was possible that a photonic crystal fiber could actually have high transmission where the fused silica was absorbing. This was borne out by the transmission measurements. A typical transmission measurement for one of our first delivered fibers is shown in FIG. 8.

Figure 9:
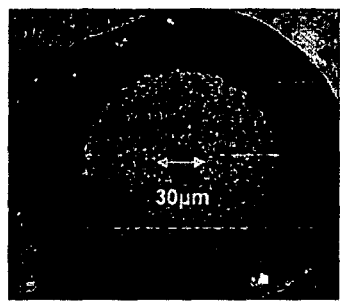
FIG. 9 is a photograph of the end of one of the fibers we used.

A photograph of the end of one of the fibers we used is shown in FIG. 9; the fused silica looks black, the gas-filled region is grey). FIG. 8 shows one of the transmission measurements. A Fourier transform spectrometer was used to make the measurements. Its detector has no sensitivity below approximately 1.5 µm, which is why the curve falls off at wavelengths shorter than that. The high transmission out to approximately 2.5 µm is light simply transmitted through the approximately 200 µm-diameter fused silica fiber. This transmission cuts off at approximately 2.5 µm because that is the wavelength at which fused silica becomes absorptive. The dips in the curve at approximately 1.9 µm and 2.2 µm are manifestations of the photonic crystal. Most significant is the transmission band near 3.5 µm. This is the wavelength for which we designed the HC-PCF 10 to transmit using the aforementioned MIT software. At this wavelength, the absorption of fused silica is >100 dB/m. This huge transmission loss in bulk fused silica makes it completely impractical for utilization at these wavelengths. However our measurements demonstrate that, surprisingly, HC-PCF silica fibers can be designed to be transmissive at these wavelengths.

Figure 10:
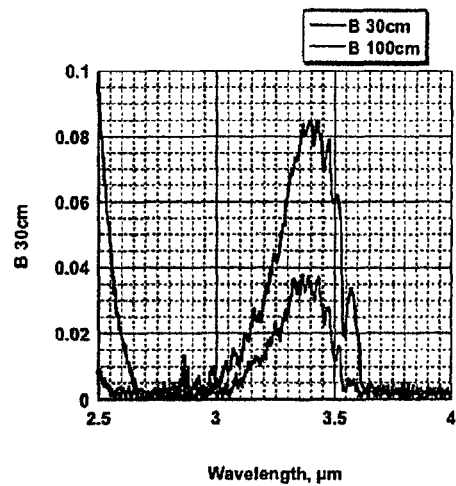
FIG. 10 shows another transmission measurement.

We quantified the transmission of the fiber by doing cutoff experiments with seven different samples of HC-PCF fiber (from different pulls) filled with air. An example of one of the measurements is shown FIG. 10. The distances 30 cm and 100 cm in the figure refer to the length of the fiber tested and a summary of the measurements for the seven different samples B-I is set forth in the following table I:

| Sample | Absorption (dB/m) |
| --- | --- |
| B | 5.4 |
| C | 6.1 |
| D | 5.0 |
| F | 6.6 |
| G | 6.0 |
| H | 4.2 |
| I | 6.4 |
| silica | ~100 |

An entry for solid silica also appears in the table. A cross section view of the HC-PCF 10 is shown in FIG. 9. The absorption numbers for samples B-I are remarkably low. A feeling for how significant these measurements are can be appreciated by again noting that fused silica has >100 dB/m absorption at 3.5 µm. Even if only 1% of mode power travels in the silica (99% in air), the mid-wave infrared (MWIR) absorption would still be on the order of 100−20=80 dB/m. The fact that it is as low as we measured is an indication that a much lower-loss mode is propagating in the silica-based HC-PCF at this long wavelength.

Thus, quite aside from using such fibers for SRS in the IR laser described above, we have invented an all-silica MWIR transmitting fiber. The preferred prior fiber for use in the IR regime is a Chalcogenide fiber. This well-established technology presently achieves better MWIR transmission that than set forth in table I. But Chalcogenide has the disadvantage that such fibers are relatively brittle and are not as easily handled as are fused silica fibers. Since the results reported in table I above reflect our first attempts at a design/fabrication of an IR transmissive silica optical fiber, we are confidant that we can improve HC-PCFs performance to compete better with existing Chalcogenide technology. See the article by Temelkuran et al. noted above. For example, we believe the 30 μm hole in the HC-PCF of FIG. 9 sustains several transverse modes, some having higher attenuation than others, and we suspect that we may have been measuring the attenuation of the lossier higher modes (our method of adapting the fiber to the spectrometer launched many possible modes). As of the date of this note, we are in the process of repeating the cut-back experiments starting with a longer fiber and measuring more lengths to ascertain whether we were indeed measuring the lowest-order-mode transmission (longer cutback experiment).

Photonic crystal fibers for IR transmission are superior to the state of the art for several reasons:

They are fabricated using now-standard procedures from fused silica, by techniques that have been refined over the last decade; no new fabrication processes need be developed.

Because they are fused silica, they are not brittle, like most Chalcogenides. They can be bent around tighter curves, not just because they are less brittle, but also because the guiding is brought about by the photonic structure, not the refractive index difference.

They contain no toxic substances, as do many of the Chalcogenides.

They can be designed for specific wavelength bands, some inaccessible to Chalcogenides.

They can be designed to also not transmit at other than a specific desired band, and so double as filters.

While the present disclosure describes various techniques and embodiments, these techniques and embodiments are to be understood as illustrative and do not limit the scope of this technology. Many variations, modifications, additions and improvements of the described embodiments are possible. For example, those having ordinary skill in the art will understand that the process parameters, materials, and dimensions are given by way of example only. The parameters, materials, and dimensions can be varied to achieve the desired structures as well as modifications, which are within the scope of the claims. Variations and modifications of the embodiments disclosed will now suggest themselves to those skilled in the art. The disclosed embodiments best explain the principles of the invention and its practical application to thereby enable others skilled in the art to utilize the disclosed technology in various embodiments and with various modifications as are suited to the particular use contemplated. It is intended that the appended claims be construed to include other alternative embodiments of the invention except insofar as limited by the prior art.

The invention claimed is:

1. An IR laser source providing light in the IR spectrum, the laser source comprising:
   (i) a pump laser operating at a frequency equivalent to wavelength shorter than 2 μm and at a predetermined power, and having a wavelength tuning range;
   (ii) an optic fiber coupled to the pump laser, the optic fiber including at least a first section of a hollow core photonic crystal fiber, the at least a first section of hollow core photonic crystal fiber being designed to have at least a passband in the IR spectrum and being filled with a molecular gas for triggering at least one Stoke's shift in light entering the at least a first section of hollow core photonic crystal fiber for the particular power of the pump laser, the at least one Stoke's shift causing the light entering the at least a first section of hollow core photonic crystal fiber to shift in frequency into the passband in the IR spectrum of the at least a first section of hollow core photonic crystal fiber, and at least a second section of hollow core photonic crystal fiber coupled to receive light from the at least a first section of hollow core photonic crystal fiber, the at least a second section of hollow core photonic crystal fiber having a passband in the IR spectrum at a longer wavelength than the passband in the IR spectrum of the at least a first section of hollow core photonic crystal fiber, the at least a second section of hollow core photonic crystal fiber being filled with a molecular gas for triggering at least one Stoke's shift in light entering the at least a second section of hollow core photonic crystal fiber, the at least one Stoke's shift causing the light entering the at least a second section of hollow core photonic crystal fiber to shift in frequency into the passband in the longer wavelength IR spectrum of the at least a second section of hollow core photonic crystal fiber.

2. The IR laser source according to claim 1 wherein the at least a first section and the at least a second section of hollow core photonic crystal fiber is made of silica.

3. The IR laser source according to claim 2 wherein the optic fiber includes a solid core silica optic fiber disposed between the pump laser and the at least a first section of hollow core photonic crystal fiber.

4. The IR laser source according to claim 3 wherein the molecular gas is selected from the group consisting of $H_2$, $CH_4$ and $D_2$.

5. The IR laser source according to claim 1 wherein the at least a section of a hollow core photonic crystal fiber is filled with a molecular gas for triggering multiple Stoke's shifts in the light entering the at least a section of hollow core photonic crystal fiber for the particular power of the pump laser.

6. The IR laser source according to claim 1 wherein the pump laser is modulated according to a modulation scheme and wherein the at least one Stoke's shift causing the light entering the at least a first section of hollow core photonic crystal fiber to shift in frequency into the passband in the IR spectrum of the at least a first section of the hollow core photonic crystal fiber, the frequency of light in the photonic crystal fiber being modulated according to said modulation scheme.

7. The IR laser source according to claim 1 wherein the pump laser operates in the IR spectrum at a frequency equivalent to wavelength shorter than 2 μm and wherein the optic fiber is coupled to the pump laser for receiving light from the pump laser in the IR spectrum.

8. The IR laser source according to claim 1 wherein the pump laser is frequency modulated whereby the IR laser source provides light in the IR spectrum as a Raman-shifted output beam with magnified FM modulation deviation.

9. The IR laser source according to claim 1 wherein the molecular gas provides means for triggering two or more Stoke's shifts in light entering the at least a section of hollow core photonic crystal fiber for the particular power of the pump laser.

10. An IR laser source providing light in the IR spectrum, the laser source comprising:
   (i) a pump laser operating at a frequency equivalent to wavelength shorter than 2 μm and at a predetermined power, and having a wavelength tuning range;

(ii) an optic fiber coupled to the pump laser, the optic fiber including a first section of a hollow core photonic crystal fiber, the first section of hollow core photonic crystal fiber being made of silica, having at least a passband in the IR spectrum and being filled with a molecular gas for triggering at least one Stoke's shift in light entering the first section of hollow core photonic crystal fiber for the particular power of the pump laser, the at least one Stoke's shift causing the light entering the first section of hollow core photonic crystal fiber to shift in frequency into the passband in the IR spectrum of the first section of hollow core photonic crystal fiber and a second section of a hollow core photonic crystal fiber coupled to receive light from the first section of hollow core photonic crystal fiber, the second section of hollow core photonic crystal fiber being designed to have at least a passband in the IR spectrum at a longer wavelength than the passband in the IR spectrum of the first section of hollow core photonic crystal fiber, the second section of hollow core photonic crystal fiber being filled with $CH_4$ for triggering at least one Stoke's shift in light entering the second section of hollow core photonic crystal fiber, the at least one Stoke's shift causing the light entering the second section of hollow core photonic crystal fiber to shift in frequency into the passband in the longer wavelength IR spectrum of the second section of hollow core photonic crystal fiber.

11. The IR laser source according to claim 10 wherein the pump laser is a ytterbium-doped fiber laser.

12. The IR laser source according to claim 10 wherein the pump laser is frequency modulated whereby the IR laser source provides light in the IR spectrum as a Raman-shifted output beam with magnified FM modulation deviation.

13. A method of providing an IR laser source with light in the IR spectrum, the method comprising:
 (i) operating a pump laser at a frequency equivalent to wavelength shorter than 2 μm and at a predetermined power, and having a wavelength tuning range;
 (ii) coupling an optic fiber to the pump laser, the optic fiber including
 (a) at least a first section of hollow core photonic crystal fiber, the at least a first section of hollow core photonic crystal fiber having at least a passband in the IR spectrum and filling the hollow core photonic crystal fiber with a molecular gas for triggering at least one Stoke's shift in light entering the at least a first section of hollow core photonic crystal fiber for the particular power of the pump laser, the at least one Stoke's shift causing the light entering the at least a first section of hollow core photonic crystal fiber to shift in frequency into the passband in the IR spectrum of the at least a first section of hollow core photonic crystal fiber; and
 (b) at least a second section a hollow core photonic crystal fiber coupled to receive light from the at least a first section of hollow core photonic crystal fiber, the at least a second section of hollow core photonic crystal fiber having a passband in the IR spectrum at a longer wavelength than the passband in the IR spectrum of the at least a first section of hollow core photonic crystal fiber, the at least a second section of hollow core photonic crystal fiber being filled with a molecular gas for triggering at least one Stoke's shift in light entering the at least a second section of hollow core photonic crystal fiber, the at least one Stoke's shift causing the light entering the at least a second section of hollow core photonic crystal fiber to shift in frequency into the passband in the longer wavelength IR spectrum of the at least a second second of hollow core photonic crystal fiber.

14. The method of providing an IR laser source according to claim 13 wherein the hollow core photonic crystal fiber is made of silica.

15. The method of providing an IR laser source according to claim 14 wherein the optic fiber includes a solid core silica optic fiber disposed between the pump laser and the at least a section of hollow core photonic crystal fiber.

16. The method of providing an IR laser source according to claim 15 wherein the molecular gas is $H_2$.

17. The method of providing an IR laser source according to claim 13 wherein the molecular gas triggers two or more Stoke's shifts in light entering the at least a section of hollow core photonic crystal fiber for the particular power of the pump laser.

* * * * *